US007801645B2

(12) United States Patent
Taylor et al.

(10) Patent No.: US 7,801,645 B2
(45) Date of Patent: Sep. 21, 2010

(54) ROBOTIC VACUUM CLEANER WITH EDGE AND OBJECT DETECTION SYSTEM

(75) Inventors: Charles E. Taylor, Punta Gorda, FL (US); Andrew J. Parker, Novato, CA (US); Shek Fai Lau, Foster City, CA (US); Eric C. Blair, San Rafael, CA (US); Andrew Heninger, Palo Alto, CA (US); Eric Ng, San Leandro, CA (US); Patricia I. Brenner, Encino, CA (US)

(73) Assignee: Sharper Image Acquisition LLC, New York, NY (US)

( * ) Notice: Subject to any disclaimer, the term of this patent is extended or adjusted under 35 U.S.C. 154(b) by 905 days.

(21) Appl. No.: 10/799,573

(22) Filed: Mar. 11, 2004

(65) Prior Publication Data

US 2004/0220698 A1 Nov. 4, 2004

Related U.S. Application Data

(60) Provisional application No. 60/454,934, filed on Mar. 14, 2003, provisional application No. 60/518,756, filed on Nov. 10, 2003, provisional application No. 60/518,763, filed on Nov. 10, 2003, provisional application No. 60/526,868, filed on Dec. 4, 2003, provisional application No. 60/527,021, filed on Dec. 4, 2003, provisional application No. 60/526,805, filed on Dec. 4, 2003.

(51) Int. Cl.
*G05B 15/00* (2006.01)
(52) U.S. Cl. .................. 700/258; 700/253; 700/255; 318/568.12; 318/567; 180/167; 901/47
(58) Field of Classification Search .................. 700/246
See application file for complete search history.

(56) References Cited

U.S. PATENT DOCUMENTS 4,674,048 A 6/1987 Okumura
4,700,427 A 10/1987 Knepper (Continued)

FOREIGN PATENT DOCUMENTS

EP 1 133 537 A1 7/2003

(Continued)

OTHER PUBLICATIONS

"Roomba" Intelligent Floor Vac, Owners Manual; 2002 iRobot Corporation; Cover page and Contents; pp. I-18.
Russell et al., "A Modern, Agent-Oriented Approach to Introductory Artificial Intelligence", Sun Microsystems Laboratories; (3 pages).
Ulrich et al., "Autonomous Vacuum Cleaner"; Laboratory of Microcomputing (LAMI); Swiss Federal Institute of Technology; Abstract: pp. 1-16.
Choset et al., "Coverage Path Planning: The Boustrophedon Cellular Decomposition"; Dept. of Mechanical Engineering, Carnegie Mellon University; Nomadic Technologies, Inc.; Abstract; (7 pages).

(Continued)

*Primary Examiner*—Thomas G Black
*Assistant Examiner*—Lin B Olsen
(74) *Attorney, Agent, or Firm*—Arent Fox LLP (57) ABSTRACT

A robot uses an infrared sensor including an infrared light source which produces pulses of infrared light. Optics focus reflections of the infrared light pulses from different portions of the environment of the robot to different detectors in a 2D array of detectors. The detectors produce an indication of the distance to the closest object in an associated portion of the environment. The robot can use the indications to determine features in the environment. The robot can be controlled to avoid these features.

32 Claims, 6 Drawing Sheets

U.S. PATENT DOCUMENTS

| | | | |
|---|---|---|---|
| 4,706,327 A | 11/1987 | Getz et al. | |
| 4,782,550 A | 11/1988 | Jacobs | |
| 4,962,453 A | 10/1990 | Pong et al. | |
| 4,977,639 A | 12/1990 | Takahashi et al. | |
| 5,012,886 A | 5/1991 | Jonas et al. | |
| 5,023,444 A | 6/1991 | Ohman | |
| 5,095,577 A | 3/1992 | Jonas et al. | |
| 5,109,566 A | 5/1992 | Kobayashi et al. | |
| 5,111,401 A | 5/1992 | Everett, Jr. et al. | |
| 5,148,573 A | 9/1992 | Killian et al. | |
| 5,208,521 A | 5/1993 | Aoyama | |
| 5,220,263 A | 6/1993 | Onishi et al. | |
| 5,276,618 A | 1/1994 | Everett, Jr. | |
| 5,279,972 A | 1/1994 | Heckenberg et al. | |
| 5,284,522 A | 2/1994 | Kobayashi et al. | |
| 5,293,955 A | 3/1994 | Lee | |
| 5,307,273 A | 4/1994 | Oh et al. | |
| 5,309,592 A | 5/1994 | Hiratsuka | |
| 5,321,614 A | 6/1994 | Ashworth | |
| 5,341,540 A | 8/1994 | Soupert et al. | |
| 5,402,051 A | 3/1995 | Fujiwara et al. | |
| 5,440,216 A | 8/1995 | Kim | |
| 5,446,356 A | 8/1995 | Kim | |
| 5,498,940 A | 3/1996 | Kim et al. | |
| 5,534,762 A | 7/1996 | Kim | |
| 5,554,917 A | 9/1996 | Kurz et al. | |
| 5,568,589 A | 10/1996 | Hwang | |
| 5,613,261 A | 3/1997 | Kawakami et al. | |
| 5,621,291 A | 4/1997 | Lee | |
| 5,622,236 A | 4/1997 | Azumi et al. | |
| 5,634,237 A | 6/1997 | Paranjpe | |
| 5,664,285 A | 9/1997 | Melito et al. | |
| 5,677,836 A | 10/1997 | Bauer | |
| 5,682,640 A | 11/1997 | Han | |
| 5,720,077 A | 2/1998 | Nakamura et al. | |
| 5,787,545 A | 8/1998 | Colens | |
| 5,815,880 A | 10/1998 | Nakanishi | |
| 5,841,259 A | 11/1998 | Kim et al. | |
| 5,894,621 A | 4/1999 | Kubo | |
| 5,940,927 A | 8/1999 | Haegermarck et al. | |
| 5,940,930 A | 8/1999 | Oh et al. | |
| 5,942,869 A | 8/1999 | Katou et al. | |
| 5,974,347 A | 10/1999 | Nelson | 701/22 |
| 5,995,883 A * | 11/1999 | Nishikado | 701/23 |
| 5,995,884 A | 11/1999 | Allen et al. | |
| 6,023,064 A * | 2/2000 | Burgin | 250/341.8 |
| 6,042,656 A | 3/2000 | Knutson | |
| 6,076,025 A | 6/2000 | Ueno et al. | |
| 6,076,226 A | 6/2000 | Reed | |
| 6,119,057 A | 9/2000 | Kawagoe | |
| 6,255,793 B1 | 7/2001 | Peless et al. | |
| 6,263,989 B1 | 7/2001 | Won | |
| 6,323,932 B1 | 11/2001 | Zhang et al. | |
| 6,323,942 B1 * | 11/2001 | Bamji | 356/5.01 |
| 6,327,741 B1 | 12/2001 | Reed | |
| 6,338,013 B1 | 1/2002 | Ruffner | |
| 6,339,735 B1 | 1/2002 | Peless et al. | |
| 6,370,453 B2 | 4/2002 | Sommer | |
| 6,389,329 B1 | 5/2002 | Colens | |
| 6,417,641 B2 | 7/2002 | Peless et al. | |
| 6,431,296 B1 | 8/2002 | Won | |
| 6,457,206 B1 | 10/2002 | Judson | |
| 6,459,955 B1 | 10/2002 | Bartsch et al. | |
| 6,480,265 B2 * | 11/2002 | Maimon et al. | 356/4.07 |
| 6,493,612 B1 | 12/2002 | Bisset et al. | |
| 6,493,613 B2 | 12/2002 | Peless et al. | |
| 6,507,773 B2 * | 1/2003 | Parker et al. | 700/258 |
| 6,508,867 B2 | 1/2003 | Schoenewald et al. | |
| 6,519,804 B1 | 2/2003 | Vujik | |
| D471,243 S | 3/2003 | Cioffi et al. | |
| 6,532,404 B2 | 3/2003 | Colens | |
| 6,535,793 B2 | 3/2003 | Allard | |
| 6,553,612 B1 | 4/2003 | Dyson et al. | |
| 6,574,536 B1 | 6/2003 | Kawagoe et al. | |
| 6,586,908 B2 | 7/2003 | Petersson et al. | |
| 6,590,222 B1 | 7/2003 | Bisset et al. | |
| 6,594,844 B2 | 7/2003 | Jones | |
| 6,597,143 B2 | 7/2003 | Song et al. | |
| 6,601,265 B1 | 8/2003 | Burlington | |
| 6,604,022 B2 * | 8/2003 | Parker et al. | 700/258 |
| 6,605,156 B1 | 8/2003 | Clark et al. | |
| 6,611,120 B2 | 8/2003 | Song et al. | |
| 6,615,108 B1 | 9/2003 | Peless et al. | |
| 6,615,885 B1 | 9/2003 | Ohm | |
| 6,657,705 B2 * | 12/2003 | Sano et al. | 356/4.01 |
| 6,661,239 B1 | 12/2003 | Ozick | |
| 6,671,592 B1 | 12/2003 | Bisset et al. | |
| 7,155,308 B2 * | 12/2006 | Jones | 700/245 |
| 2001/0022506 A1 | 9/2001 | Peless et al. | |
| 2001/0047895 A1 | 12/2001 | De Fazio et al. | |
| 2002/0025472 A1 | 2/2002 | Komori et al. | |
| 2002/0060542 A1 | 5/2002 | Song et al. | |
| 2002/0063775 A1 | 5/2002 | Taylor | |
| 2002/0091466 A1 | 7/2002 | Song et al. | |
| 2002/0112899 A1 | 8/2002 | Dijksman et al. | |
| 2002/0120364 A1 | 8/2002 | Colens | |
| 2002/0140633 A1 | 10/2002 | Rafii et al. | |
| 2002/0153855 A1 | 10/2002 | Song et al. | |
| 2003/0030398 A1 | 2/2003 | Jacobs et al. | |
| 2003/0039171 A1 | 2/2003 | Chiapetta | |
| 2003/0060928 A1 | 3/2003 | Abramson et al. | |
| 2003/0076484 A1 | 4/2003 | Bamji et al. | |
| 2003/0120389 A1 | 6/2003 | Abramson et al. | |
| 2003/0192144 A1 | 10/2003 | Song et al. | |
| 2003/0208304 A1 | 11/2003 | Peless et al. | |
| 2003/0229421 A1 | 12/2003 | Chmura et al. | |
| 2004/0088079 A1 * | 5/2004 | Lavarec et al. | 700/258 |

FOREIGN PATENT DOCUMENTS

| | | |
|---|---|---|
| GB | 2 344 747 A | 6/2000 |
| GB | 2 344 748 A | 6/2000 |
| GB | 2 352 486 A | 1/2001 |
| GB | 2 355 523 A | 4/2001 |
| GB | 2 369 511 A | 5/2002 |
| JP | 05046246 | 2/1993 |
| WO | WO 9113319 A1 * | 9/1991 |
| WO | WO 00/36968 | 6/2000 |
| WO | WO 00/36970 | 6/2000 |
| WO | WO 00/38255 | 6/2000 |
| WO | WO 00/73868 | 12/2000 |
| WO | WO 01/01208 | 1/2001 |
| WO | WO 01/28400 | 4/2001 |
| WO | WO 02/067744 | 9/2002 |
| WO | WO 02/075469 | 9/2002 |
| WO | WO 03/031285 | 4/2003 |
| WO | WO 03/062937 | 7/2003 |
| WO | WO 03/104909 | 12/2003 |

OTHER PUBLICATIONS

JACO; Trash Retrieval Robot; University of Florida; Department of Electrical and Computer Engineering; EEL 5666; Intelligent Machine Design Laboratory; Aaron Grassian; Apr. 29, 1997; (15 pages).

Doty et al., "Sweep Strategies for a Sensory-Driven, Behavior-Based Vacuum Cleaning Agent"; Machine Intelligence Laboratory; University of Florida, Gainesville, Fl.; AAAI 1993 Fall Symposium Series; Instantiating Real-World Agents; Research Triangle Park, Raleigh, NC; Oct. 22-24, 1993; pp. 1-6.

* cited by examiner

ROBOTIC VACUUM CLEANER WITH EDGE AND OBJECT DETECTION SYSTEM

CLAIM OF PRIORITY

This application claims priority to U.S. Patent Provisional Application No. 60/454,934 filed Mar. 14, 2003; U.S. Provisional Application No. 60/518,756 filed Nov. 10, 2003; U.S. Provisional Application No. 60/518,763 filed Nov. 10, 2003; U.S. Provisional Application No. 60/526,868 filed Dec. 4, 2003; U.S. Provisional Application No. 60/527,021 filed Dec. 4, 2003 and U.S. Provisional Application No. 60/526,805 filed Dec. 4, 2003. This application incorporates by reference U.S. application Ser. No. 10/798,232 entitled "Robot Vacuum" by Taylor et al., filed concurrently and published as US Pub.20040244138, which has been abandoned.

This application is related to the following commonly owned, co-pending applications:

CROSS REFERENCE TO RELATED APPLICATIONS

U.S. Patent Appln. Nos. Filed
Ser. No. 10/798,232 Mar. 11, 2004
Ser. No. 10/799,916 Mar. 11, 2004
Ser. No. 10/798,732 Mar. 11, 2004
Ser. No. 10/798,716 Mar. 11, 2004
Ser. No. 10/798,231 Mar. 11, 2004
Ser. No. 10/798,228 Mar. 11, 2004
Ser. No. 11/104,890 Apr. 13, 2004
Ser. No. 11/171,031 Jun. 6, 2005
Ser. No. 11/574,290 Feb. 26, 2007

FIELD OF THE INVENTION

The present invention relates to sensors, particularly to sensors for robots.

BACKGROUND

A number of sensors have been developed for use on robots. Infrared (IR) or sonar sensors have been used on robots to detect wall or other objects. The information from the sensors can be used to map the environment of the robot. Mapping the environment of a robot using such sensors can be difficult. Often, information from different times or from multiple sensors is need to be combined in order to determine environmental features. Such relatively complex calculations can be difficult to do in real-time especially when other software processes needs to be executed on the robot.

It is desired to have a robot using an improved infrared sensors.

BRIEF SUMMARY

One embodiment of the present invention is a robot including a motion unit; an infrared sensor and a processor. The infrared sensor includes an infrared light source to produce pulses of infrared light, optics to focus reflections from the infrared light pulse from different portions of the environment of the robot to different detectors in a 2D array of detectors. The detectors of the 2D array of detectors are adapted to produce an indication of the distance to the closest object in an associated portion of the environment. The processor receives the indications from the infrared sensor, determines a feature in the environment using the indications and controls the motion unit to avoid the feature.

An embodiment of the present invention is a method including producing pulses of infrared light, focusing reflections from the infrared light pulse from different portions of the environment of a robot to different detectors in a 2D array of detectors, the detectors producing an indication of the distance to the closest object in an associated portion of the environment, and using the indications from the infrared sensor to determine a feature in the environment so that the robot can be controlled to avoid the feature.

DETAILED DESCRIPTION

Figure 1:
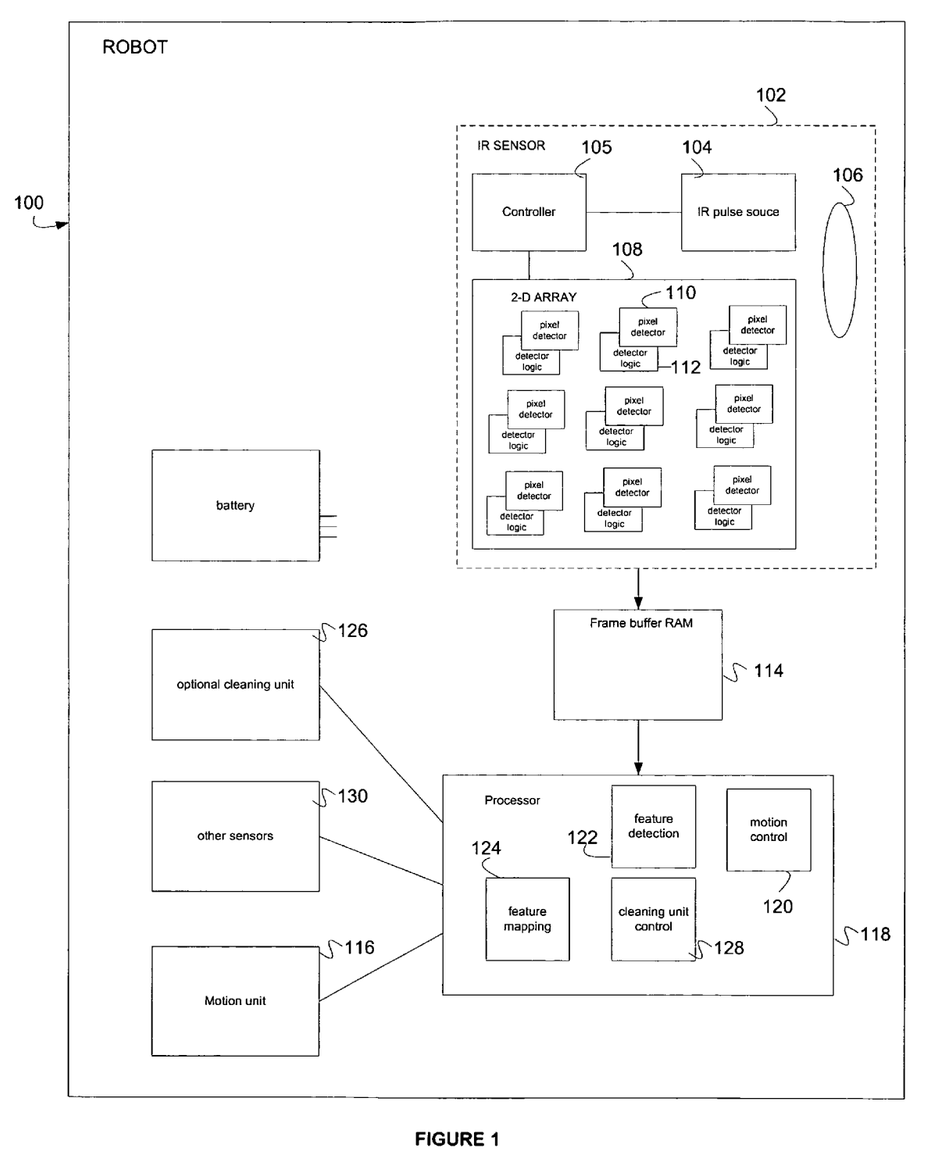
FIG. 1 is a functional diagram of a robot including an infrared sensor of one embodiment of the present invention.

FIG. 1 illustrates one example of a Robot 100. In the example of FIG. 1, the Robot 100 includes a motion unit 116. The motion unit 116 can be for example, wheels, tracks, legs or any element to move the robot 100. In one embodiment, the processor 118 uses motion control software 120 to control the motion unit 116. The motion unit 116 can include wheels, tracks, wings, legs or any other means of locomotion. The robot 100 also includes an IR sensor 102.

An infrared sensor 102 includes an infrared light source 104. The infrared light source 104 can produce pulses of infrared light. An infrared light sensor 102 includes optics 106 to focus reflections from an infrared light source pulse from different portions of the environment to different detectors in a two dimensional (2D) array of the detectors 108. The optics 106 can include a single or multiple optical elements. In one embodiment, the optics 106 focus light reflected from different regions of the environment to the detectors in the 2D array 108. The detectors produce indications of the distances to the closest objects in associated portions of the environment. In the example of FIG. 1, the 2D array includes pixel detectors 110 and associated detector logic 112. In one embodiment, the 2D array of detectors is constructed of CMOS technology on a semiconductor substrate. The pixel detectors can be photodiodes. The detector logic 112 can include counters. In one embodiment, a counter for a pixel detector runs until a reflected pulse is received. The counter value thus indicates the time for the pulse to be sent from the IR sensor and reflected back from an object in the environment to the pixel detector. Different portions of environment with different objects will have different pulse transit times.

In one embodiment, each detector produces an indication of the distance to the closest object in the associated portion of the environment. Such indications can be sent from the 2D detector array 108 to a memory such as the Frame Buffer RAM 114 that stores frames of the indications. A frame can contain distance indication data of the pixel detectors for a single pulse.

Controller 105 can be used to initiate the operation of the IR pulse source 104 as well as to control the counters in the 2D detector array 108.

An exemplary infrared sensor for use in the present invention is available from Canesta, Inc. of San Jose, Calif. Details of such infrared sensors are described in the U.S Pat. No. 6,323,942 and published patent applications US 2002/0140633 A1, US 2002/0063775 A1, US 2003/0076484 A1 each of which are incorporated herein by reference.

The processor 118 in one embodiment is adapted to receive the indications from the IR sensor 102. In one embodiment, the indications are stored in the frame buffer Random Access Memory (RAM) 114. The indications are used by the processor to determine a feature in the environment and to control the motion of the unit to avoid the feature. Examples of features include steps, walls and objects such as a chair legs. The advantage of the above described IR sensor with a two-dimensional array of detectors is that a full frame of distance indications can be created. Full frames of distance indications simplify feature detection. The burden on the processor 118 is also reduced. In one embodiment, feature detection software 122 receives frames of indications and uses the frames to detect features. Once the features are determined, the features can be added to an internal environment map with feature mapping software 124. The motion control software 120 can be used to track the position of the robot 100. Alternately, other elements can be used for positioning the robot In one embodiment, the robot uses the indications from the detector to determine how to move the robot so that the robot avoids falling down stairs, and bumping into walls and other objects.

In one embodiment, the robot 100 is a robot cleaner that has an optional cleaning unit 126. Cleaning control software 128 can be used to control the operation of the cleaning unit 126.

In one embodiment, other sensors 130 are used. The other sensors 130 can include sonar sensors or simple infrared sensors positioned around the perimeter of the robot. The other sensors 130 can be used to improve the mapping or other operations of the robot 100.

One embodiment of the present invention is a robot, such as robot cleaner 100, that includes a sensor 102 producing multiple indications of distances to the closest object in an associated portion of the environment. A processor 118 receives indications from the sensor, determines a feature in the environment and controls a motion unit to avoid the feature. A determined feature can be indicated in an internal map. The determined feature can be a step, an object in a room, or other element.

Figure 2:
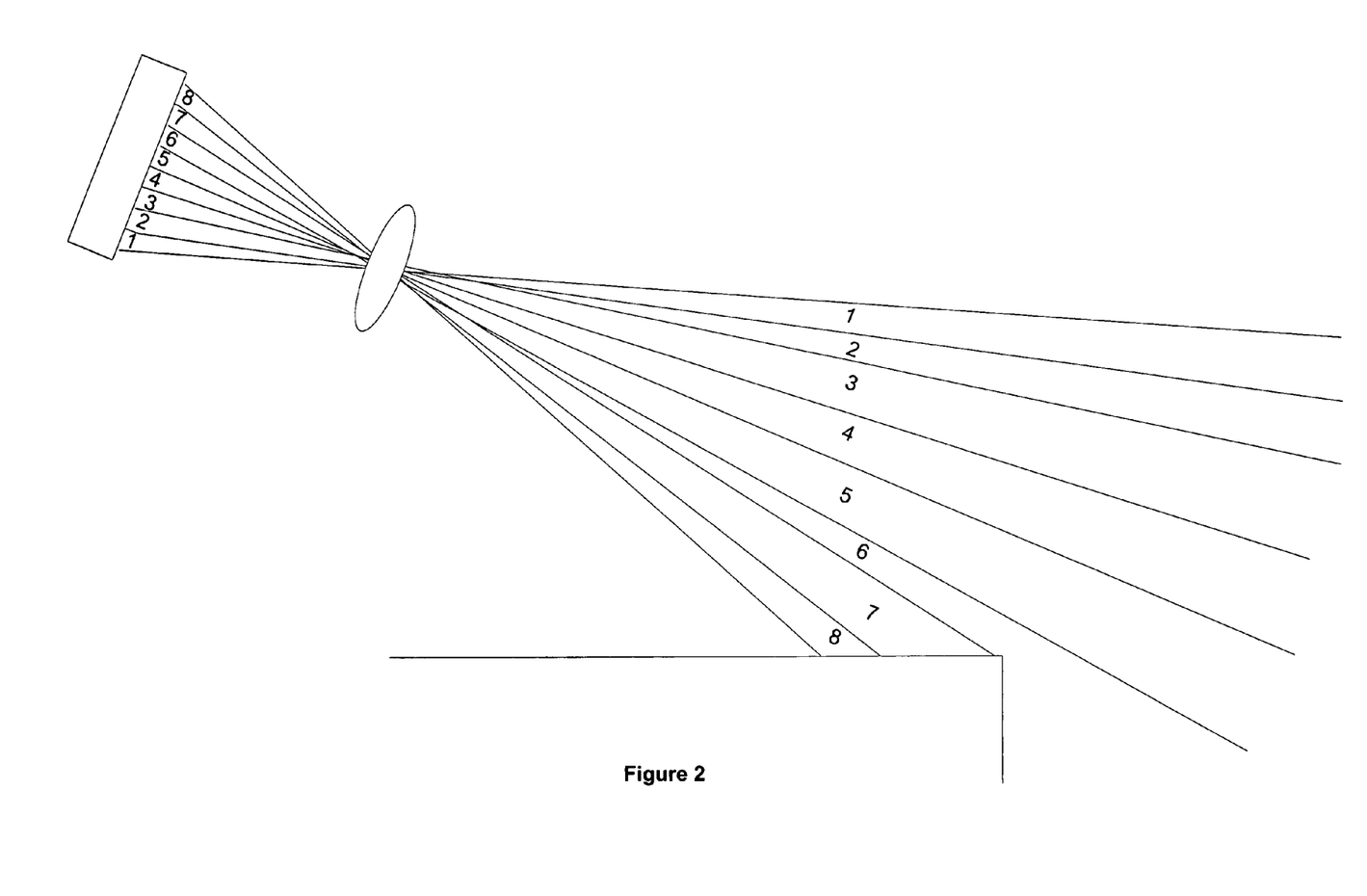
FIG. 2 illustrates an example showing the operation of the infrared sensor of one embodiment of the present invention.

FIG. 2 illustrates the operation of a two-dimensional array of detectors. In the example of FIG. 2, a simplified one-dimensional slice of the two dimensional array is shown. In this example, regions 1, 2, 3, 4 and 5 extend over the edge of the step and thus do not receive substantial reflections back to the two-dimensional array. Region 6 receives some reflections and steps 7 and 8 receive even more reflections.

Figure 3:
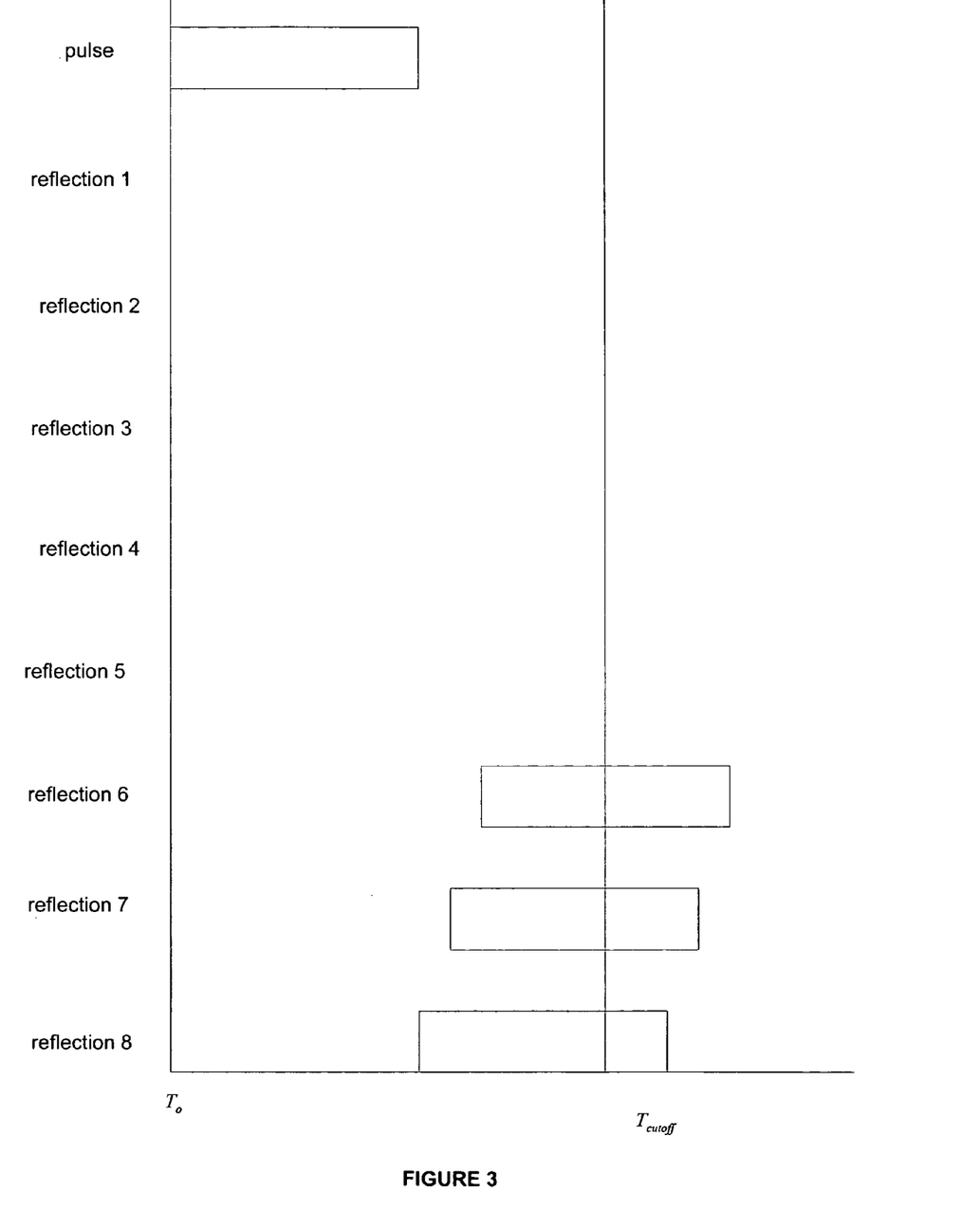
FIG. 3 is a diagram that illustrates the use of reflected pulses for the example of FIG. 2.

FIG. 3 illustrates an exemplary timing diagram for the reflections of the example of FIG. 2. Reflections from objects located closer to the robot will return to the sensor sooner than reflections from objects that are further away. In one embodiment, the time from the start of the pulse to the start of the received reflection indicates the distance to an object.

Depending on the orientation of the objects, the detected reflections can be defuse or specular. Specular reflections are mirror-like reflections that result in high reflected intensities for a narrow angle range. Defuse reflections are relatively low intensities over a wider angle range. In the orientations of FIG. 3, floors and carpets tend to result in defuse reflections at the sensor while perpendicular objects such as walls tend to result in specular reflections at the sensor. The intensity of the reflected energy can be useful in obtaining information concerning the type of reflections. Reflective devices can be placed in the environment to increase the specular reflections at stair edges or other locations. In one example, the reflective devices can use retro reflective material such as a retro reflective tape or ribbon.

Alternately, the IR sensor can be oriented pointing down onto the floor at the edge of the robot. This results in greater specular reflections when the robot is over the floor. When the robot is over a descending stairway the reflections will be reduced. Based on this information the descending stairway can be detected. Using the IR sensor 102 with a 2D array 108 has the additional advantage that the orientation of the edge of the descending stairway can be determined. This can often give hints as to the orientation of a robot with respect to the room.

In one embodiment, the transmitted pulse is modulated. The modulated pulse can be used to detect low-energy defuse reflections.

In one embodiment, a cutoff time, $t_{cutoff}$, can be used. The total detected energy up to the cutoff time gives some indication of distance. The more reflected energy received up to the cutoff time, the closer the object is to the infrared sensor. Such an embodiment is especially useful for specular reflections.

Figure 4:
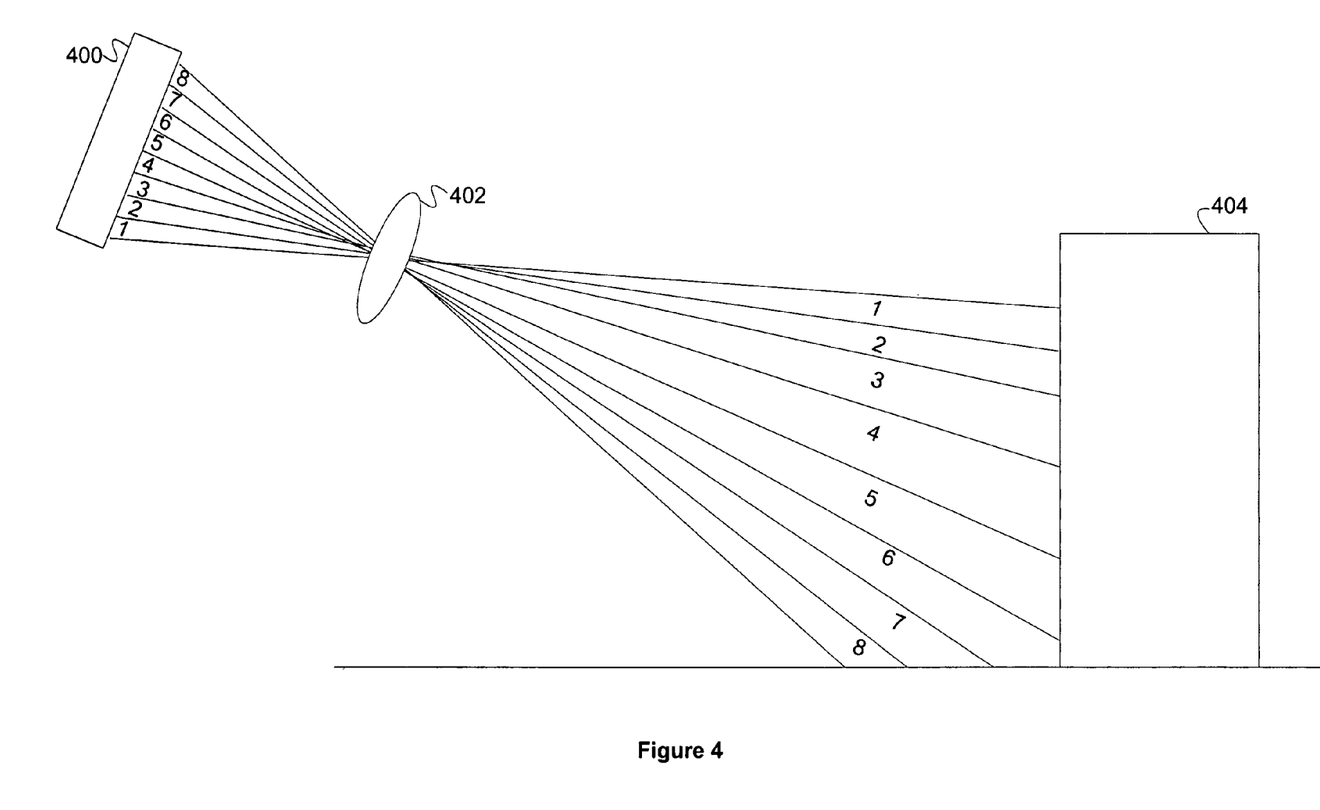
FIG. 4 illustrates another embodiment of the operation of the infrared sensor for a robot.
Figure 5:
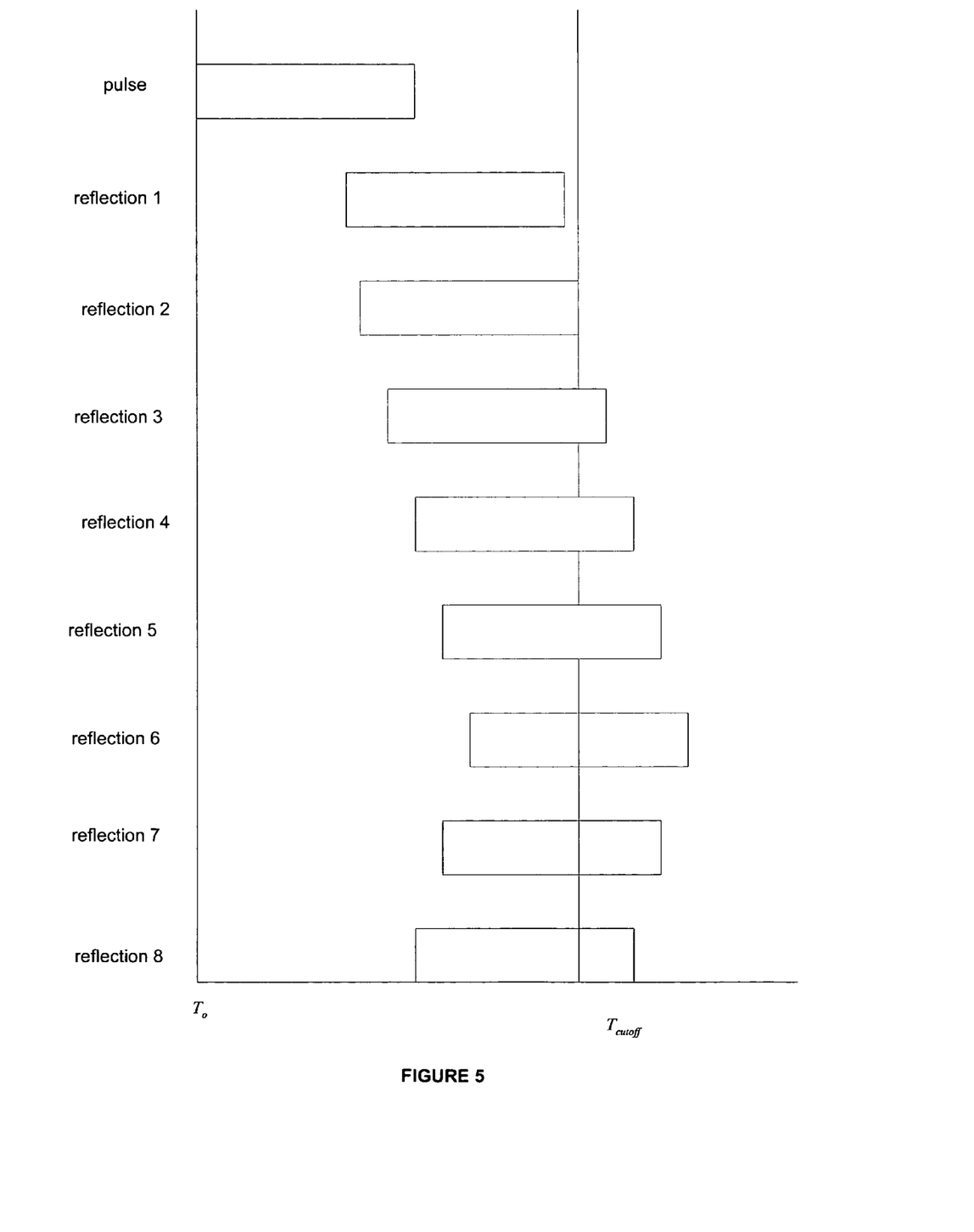
FIG. 5 illustrates the use of reflective pulses for the example of FIG. 4.

FIG. 4 illustrates an example, in which an object 404 is detected by the 2D array 400 and optics 402. The regions that detect the objects 404 regions 1, 2, 3, 4 and 5 will typically have relatively strong reflections. FIG. 5 illustrates an exemplary timing diagram for the reflections of the example of FIG. 4.

Figure 6A:
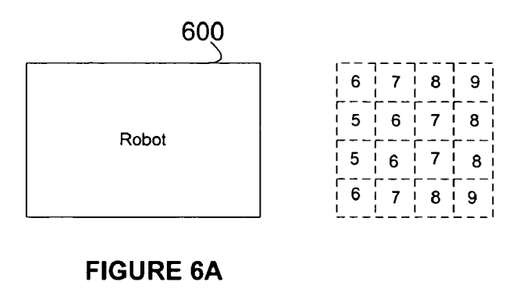
FIG. 6A-6D illustrates the operation of the infrared sensor to detect features in the environment of a robot.

Examples of the operation of an infrared detector of one embodiment are shown in FIGS. 6A to 6D. The example of 6A shows a simplified embodiment in which a 2D array produces a frame of indications of the distances to the closest objects in the environment. In the example of FIG. 6A, an exemplary 4×4 frame of indications is used but the frame size and the number of regions examined can be much larger.

Figure 6B:
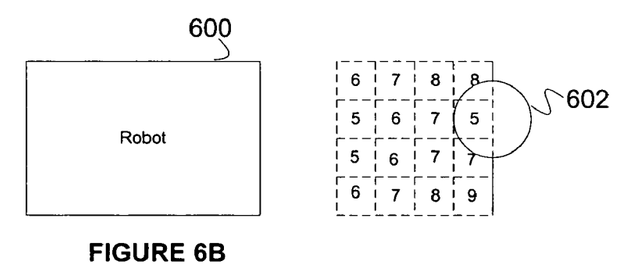
Figure 6C:
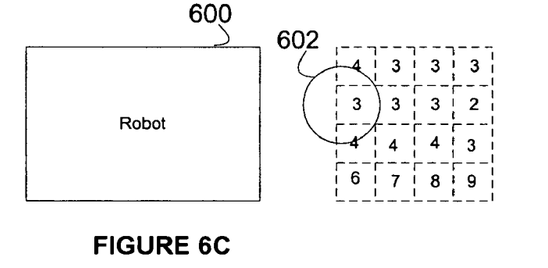

The regions are three dimensional but form a footprint on the floor shown by the dotted lines of FIG. 6A. The example of FIG. 6A illustrates the distance indications for a flat floor. FIG. 6B illustrates a case in which an object 602 is in the detected region for the IR sensor. FIG. 6C shows an example when the object 602 is closer to the robot. The changes of the distance indications can be used determine the size and location of the object. Walls can be detected due to their characteristic patterns.

Figure 6D:
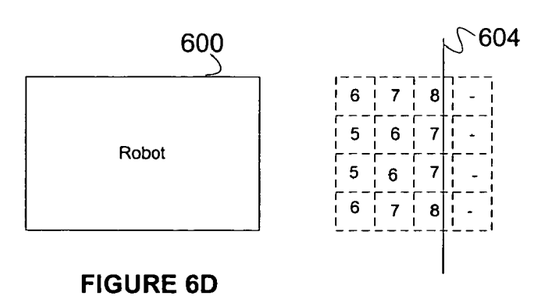

FIG. 6D illustrates an example of when the robot 600 approaches a step 604. In this example, some regions indicate greatly increased distances or have no detected reflections due to the step. The robot 600 can thus determine the location of the step. Steps and objects can be avoided by the robot 600. The position of the objects and steps can be stored in an internal map maintained by the robot 600.

The foregoing description of preferred embodiments of the present invention has been provided for the purposes of illustration and description. It is not intended to be exhaustive or to limit the invention to the precise forms disclosed. Many embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalence.

What is claimed is:

1. A robot comprising:
   a motion unit;
   a two-dimensional (2D) array of detectors supported by the motion unit, each detector having a counter associated therewith, the 2D array operable to generate a frame of distance indications to one or more features in an environment in which the robot operates;

an infrared sensor including: (a) an infrared light source configured to produce a plurality of modulated pulses of infrared light directed toward the environment of the robot; and (b) at least one optic element configured to focus a plurality of reflections of the infrared light pulses from the environment of the robot to the 2D array of detectors, causing the detection of the 2D array of detectors, wherein the modulated pulses enable detection of low-energy diffuse reflections; and at least one processor operatively coupled to the 2D array of detectors, the processor operable: (a) to determine one or more features of the environment based at least in part on one or more frames of distance indications; and (b) to control the motion unit of the robot to avoid the one or more detected features.

2. The robot of claim 1, wherein the distance indication is produced by the counter measuring a period of time to receive a reflected pulse.

3. The robot of claim 2, wherein the feature is indicated in an internal map of the environment.

4. The robot of claim 2, wherein the feature is a step.

5. The robot of claim 2, wherein the feature is an object in a room.

6. The robot of claim 1, wherein the distance indication is produced by measuring an energy of a reflected pulse up to a cutoff time.

7. The robot of claim 1, wherein the robot is a robot cleaner.

8. The robot of claim 1, wherein the processor is further operable to add the one or more determined features to an internal map of the environment.

9. The robot of claim 1, further comprising a memory device for storing the one or more distance indications.

10. A method for controlling a robot comprising:
producing a plurality of modulated pulses of infrared light directed toward an environment of the robot;
focusing with at least one optic element a plurality of reflections of the infrared light pulses from the environment of the robot to a two-dimensional (2D) array of detectors;
detecting by the 2D array of detectors the plurality of reflections of the infrared light pulses, wherein the modulated pulses enable detection of low-energy diffuse reflections;
generating a frame of distance indications to one or more features in the environment;
processing the generated one or more frames of distance indications to determine one or more features of the environment; and
controlling the motion of the robot to avoid the one or more features of the environment.

11. The method of claim 10, wherein the distance indication is produced by a counter measuring the time to receive a reflected pulse.

12. The method of claim 11, wherein the feature is indicated in an internal map of the environment.

13. The method of claim 11, wherein the feature is a step.

14. The method of claim 11, wherein the feature is an object in a room.

15. The method of claim 10, wherein the distance indication is produced by measuring the energy of a reflected pulse up to a cutoff time.

16. The method of claim 10, wherein the robot is a robot cleaner.

17. A robot comprising:
an infrared light source configured to produce a plurality of modulated pulses of infrared light directed toward an environment of the robot;
a two-dimensional (2D) array of detectors, each detector having a counter associated therewith, the 2D array operable:
(a) to detect a plurality of reflections of the infrared light pulses from the environment, including low-energy diffuse reflections; and
(b) to generate a frame of distance indications to one or more features of the environment;
at least one processor operatively coupled to the 2D array of detectors, the processor operable:
(a) to determine one or more features of the environment based at least in part on one or more frames of distance indications; and
(b) to control the motion of the robot to avoid the one or more detected features.

18. The robot of claim 17, wherein the distance indication is produced by the counter measuring a period of time to receive a reflected pulse.

19. The robot of claim 18, wherein the feature is indicated in an internal map of the environment.

20. The robot of claim 18, wherein the feature is a step.

21. The robot of claim 18, wherein the feature is an object in a room.

22. The robot of claim 17, wherein the distance indication is produced by measuring an energy of a reflected pulse up to a cutoff time.

23. The robot of claim 17, wherein the robot is a robot cleaner.

24. The robot of claim 17, wherein the processor is further operable to add the one or more determined features to an internal map of the environment.

25. The robot of claim 17, further comprising a memory device for storing the one or more distance indications.

26. A method for controlling a robot comprising:
transmitting a plurality of modulated pulses of infrared light toward an environment of the robot;
detecting by an infrared detector a plurality of low-energy diffuse reflections of the infrared light pulses indicating distances to one or more features of an environment;
processing one or more distance indications to determine one or more features of the environment;
adding the one or more determined features to an internal map of the environment; and
controlling the motion of the robot to avoid the one or more features of the environment.

27. The method of claim 26, wherein the distance indication is produced by measuring the time to receive a reflected pulse from one or more features of the environment.

28. The method of claim 26, wherein the distance indication is produced by measuring the energy of a reflected pulse from one or more features of the environment.

29. The method of claim 26, wherein one or more features are indicated in the internal map of the environment.

30. The method of claim 26, wherein the feature is a step.

31. The method of claim 26, wherein the feature is an object in a room.

32. The method claim 26, wherein the robot is a robot cleaner.

* * * * *